United States Patent
Mihara

(10) Patent No.: US 9,781,573 B2
(45) Date of Patent: Oct. 3, 2017

(54) TRANSMISSION MANAGEMENT SYSTEM, TRANSMISSION SYSTEM, TRANSMISSION MANAGEMENT METHOD, AND STORAGE MEDIUM

(71) Applicant: Akihiro Mihara, Tokyo (JP)

(72) Inventor: Akihiro Mihara, Tokyo (JP)

(73) Assignee: RICOH COMPANY, LTD., Tokyo (JP)

(\*) Notice: Subject to any disclaimer, the term of this patent is extended or adjusted under 35 U.S.C. 154(b) by 0 days.

(21) Appl. No.: 15/041,727

(22) Filed: Feb. 11, 2016

(65) Prior Publication Data
US 2016/0242007 A1 Aug. 18, 2016

(30) Foreign Application Priority Data
Feb. 17, 2015 (JP) .................... 2015-029064

(51) Int. Cl.
*H04W 24/00* (2009.01)
*H04W 4/02* (2009.01)
(Continued)

(52) U.S. Cl.
CPC ....... *H04W 4/028* (2013.01); *H04M 3/42348* (2013.01); *H04M 3/42365* (2013.01); *H04M 3/567* (2013.01); *H04W 12/02* (2013.01); *H04W 76/02* (2013.01); *H04M 2203/2033* (2013.01); *H04M 2203/2072* (2013.01); *H04M 2203/6009* (2013.01)

(58) Field of Classification Search
CPC ..... H04W 4/028; H04W 12/02; H04W 76/02; H04M 3/42348; H04M 3/42365; H04M 3/567; H04M 2203/2033; H04M 2203/2072; H04M 2203/6009
USPC ............ 455/456.4, 456.5, 457, 414.1, 414.2; 715/753
See application file for complete search history.

(56) References Cited

U.S. PATENT DOCUMENTS 9,094,573 B2 7/2015 Uchiyama
2007/0078965 A1 4/2007 Shimamura et a.
(Continued)

FOREIGN PATENT DOCUMENTS

JP 2013-251812 12/2013

OTHER PUBLICATIONS

Extended European Search Report issued Jun. 22, 2016 in European Patent Application No. 16155030.6.

Primary Examiner — Wayne Cai
(74) Attorney, Agent, or Firm — Oblon, McClelland, Maier & Neustadt, L.L.P.

(57) ABSTRACT

A transmission management system for controlling data transmission between a first transmitting terminal and a second transmitting terminal is provided. The transmission management system includes a receiving unit that receives location information about the second transmitting terminal; and a transmitting unit that transmits first presence information about the first transmitting terminal to the second transmitting terminal depending on first location information about the second transmitting terminal received by the receiving unit, and transmits second presence information about the first transmitting terminal to the second transmitting terminal depending on second location information about the second transmitting terminal received by the receiving unit.

9 Claims, 13 Drawing Sheets

| USER ID | SETTING NUMBER | LOCATION OF OWN USER | LOCATION OF PARTNER USER | TIME | PARTNER USER ID | OWN PRESENCE STATUS | PRESENCE STATUS REPORT |
|---|---|---|---|---|---|---|---|
| 01aa | 1 | Any | Any | Any | Any | OFFLINE | OFFLINE |
| | 2 | Any | Any | Any | Any | ON THE PHONE | ON THE PHONE |
| | 3 | Any | Any | Any | NOT 01bb | UNABLE TO RESPOND | UNABLE TO RESPOND |
| | 4 | Any | Any | Any | 01bb | UNABLE TO RESPOND | ABLE TO RESPOND |
| | 5 | HOME | Any | Any | Any | Any | OFFLINE |
| | 6 | Any | NOT OFFICE | MONDAYS 10:00-11:00 | Any | NOT OFFLINE | UNABLE TO RESPOND |
| | 7 | Any | Any | EVERY DAY 12:00-13:00 | Any | NOT OFFLINE | UNABLE TO RESPOND |
| | 8 | Any | Any | WEDNESDAYS 13:00-14:00 | NOT 01ab,01ba | NOT OFFLINE | UNABLE TO RESPOND |
| | 9 | COMPANY A | Any | Any | NOT 01bb | NOT OFFLINE | UNABLE TO RESPOND |
| | ... | ... | ... | ... | ... | ... | ... |
| | N | Any | Any | Any | Any | Any | ABLE TO RESPOND |
| 01ab | ... | ... | ... | ... | ... | ... | ... |
| ... | ... | ... | ... | ... | ... | ... | ... |

(51) Int. Cl.
*H04W 12/02* (2009.01)
*H04W 76/02* (2009.01)
*H04M 3/42* (2006.01)
*H04M 3/56* (2006.01)

(56) References Cited

U.S. PATENT DOCUMENTS

2012/0009900 A1   1/2012   Chawla
2013/0111365 A1*  5/2013   Chen ................ H04L 51/10
                                            715/756
2015/0099545 A1*  4/2015   Hyun ................ H04W 4/02
                                            455/456.3

* cited by examiner

FIG.2

| USER ID | SETTING NUMBER | LOCATION OF OWN USER | LOCATION OF PARTNER USER | TIME | PARTNER USER ID | OWN PRESENCE STATUS | PRESENCE STATUS REPORT |
|---|---|---|---|---|---|---|---|
| 01aa | 1 | Any | Any | Any | Any | OFFLINE | OFFLINE |
|  | 2 | Any | Any | Any | Any | ON THE PHONE | ON THE PHONE |
|  | 3 | Any | Any | Any | NOT 01bb | UNABLE TO RESPOND | UNABLE TO RESPOND |
|  | 4 | Any | Any | Any | 01bb | UNABLE TO RESPOND | ABLE TO RESPOND |
|  | 5 | HOME | Any | Any | Any | Any | OFFLINE |
|  | 6 | Any | NOT OFFICE | MONDAYS 10:00–11:00 | Any | NOT OFFLINE | UNABLE TO RESPOND |
|  | 7 | Any | Any | EVERY DAY 12:00–13:00 | Any | NOT OFFLINE | UNABLE TO RESPOND |
|  | 8 | Any | Any | WEDNESDAYS 13:00–14:00 | NOT 01ab,01ba | NOT OFFLINE | UNABLE TO RESPOND |
|  | 9 | COMPANY A | Any | Any | NOT 01bb | NOT OFFLINE | UNABLE TO RESPOND |
|  | ... | ... | ... | ... | ... | ... | ... |
|  | N | Any | Any | Any | Any | Any | ABLE TO RESPOND |
|  | ... | ... | ... | ... | ... | ... | ... |
| 01ab | ... | ... | ... | ... | ... | ... | ... |
| ... |  |  |  |  |  |  |  |

FIG.3

| USER ID | LOCATION | LOCATION AREA (LATITUDE OF CENTER, LONGITUDE OF CENTER, RADIUS) |
|---|---|---|
| 01aa | HOME | N:35.658804,E:139.745407,20m |
| | OFFICE | N:35.511166,E:139.620745,50m |
| | COMPANY A | N:35.667112,E:139.763179,50m |
| | ... | ... |
| 01ab | ... | ... |
| ... | | |

FIG.4

| USER ID | USER NAME | OWN PRESENCE STATUS | IP ADDRESS | LOCATION INFORMATION | LOCATION INFORMATION RECEPTION DATE AND TIME |
|---|---|---|---|---|---|
| 01aa | REIJI ABE | ABLE TO RESPOND | 1.2.1.3 | N:35.521166,E:139.720745 | 2015.01.26.15:25 |
| 01ab | ICHIRO INOUE | OFFLINE | 1.2.1.4 | - | - |
| 01ba | HANAKO UNO | ON THE PHONE | 1.2.2.3 | N:35.531166,E:139.820745 | 2015.01.26.15:19 |
| 01cb | JIRO ETO | UNABLE TO RESPOND | 1.2.2.4 | N:35.541166,E:139.920745 | 2015.01.26.15:21 |
| 01db | TARO YAMADA | ABLE TO RESPOND | 1.3.1.3 | N:35.667112,E:139.763179 | 2015.01.26.15:23 |
| ... | ... | ... | ... | ... | ... |

FIG.5

| REPORT DESTINATION USER ID | DESTINATION USER ID |
|---|---|
| 01aa | 01ab,01ba,01db,01dc,01ca,01cb |
| 01ab | 01aa,01ca,01cb |
| 01ba | 01aa,01ab,01ca,01cb,01da,01db |
| 01cb | 01db |
| ... | ... |
| 01db | 01aa,01ab,01ba,・・・,01da,01ca,01cb |

FIG.6

| PARTNER USER ID | OWN USER ID | PRESENCE STATUS REPORT OF OWN USER FOR PARTNER USER | SETTING NUMBER |
|---|---|---|---|
| 01db | 01aa | UNABLE TO RESPOND | 6 |
| ... | ... | ... | ... |

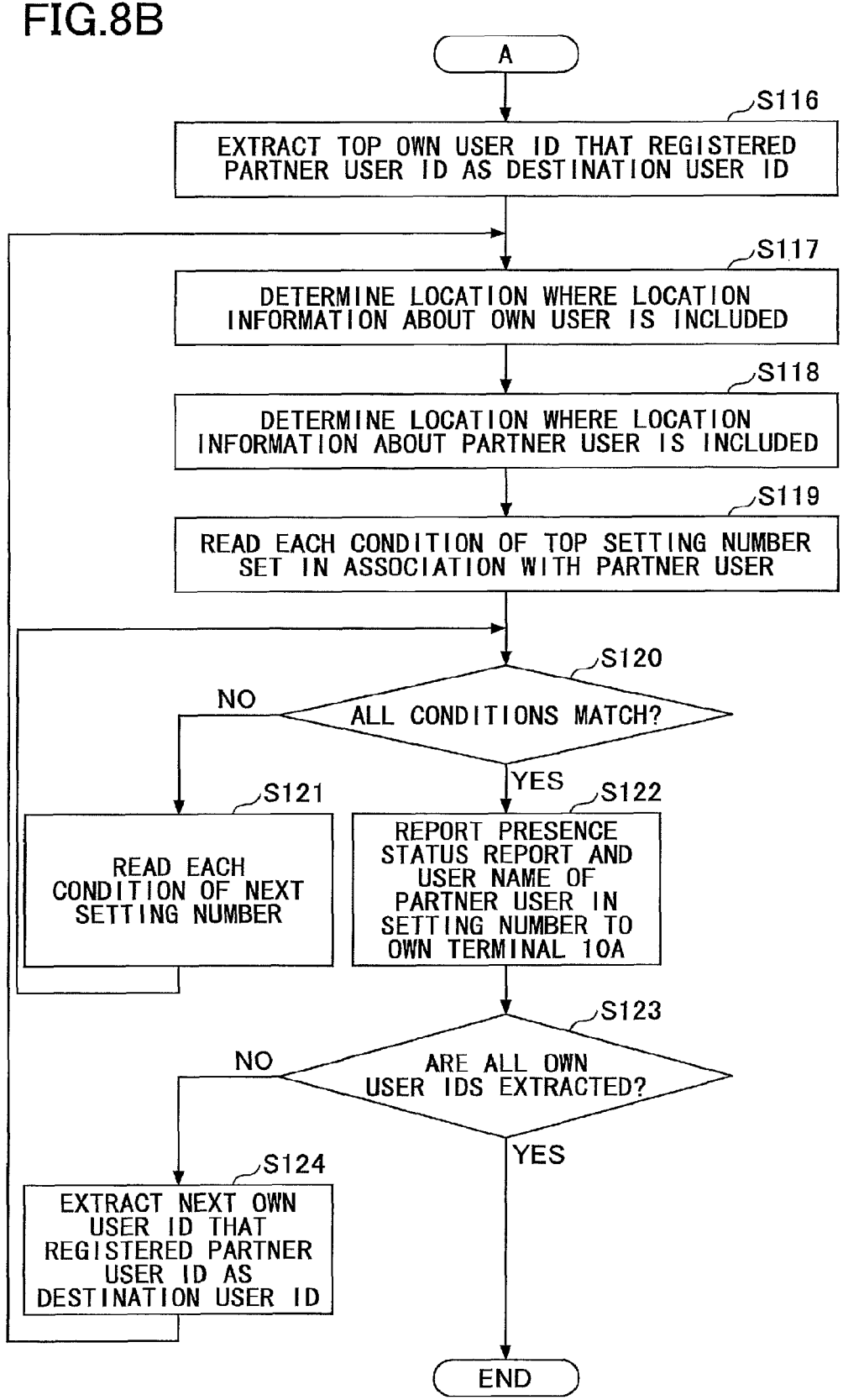

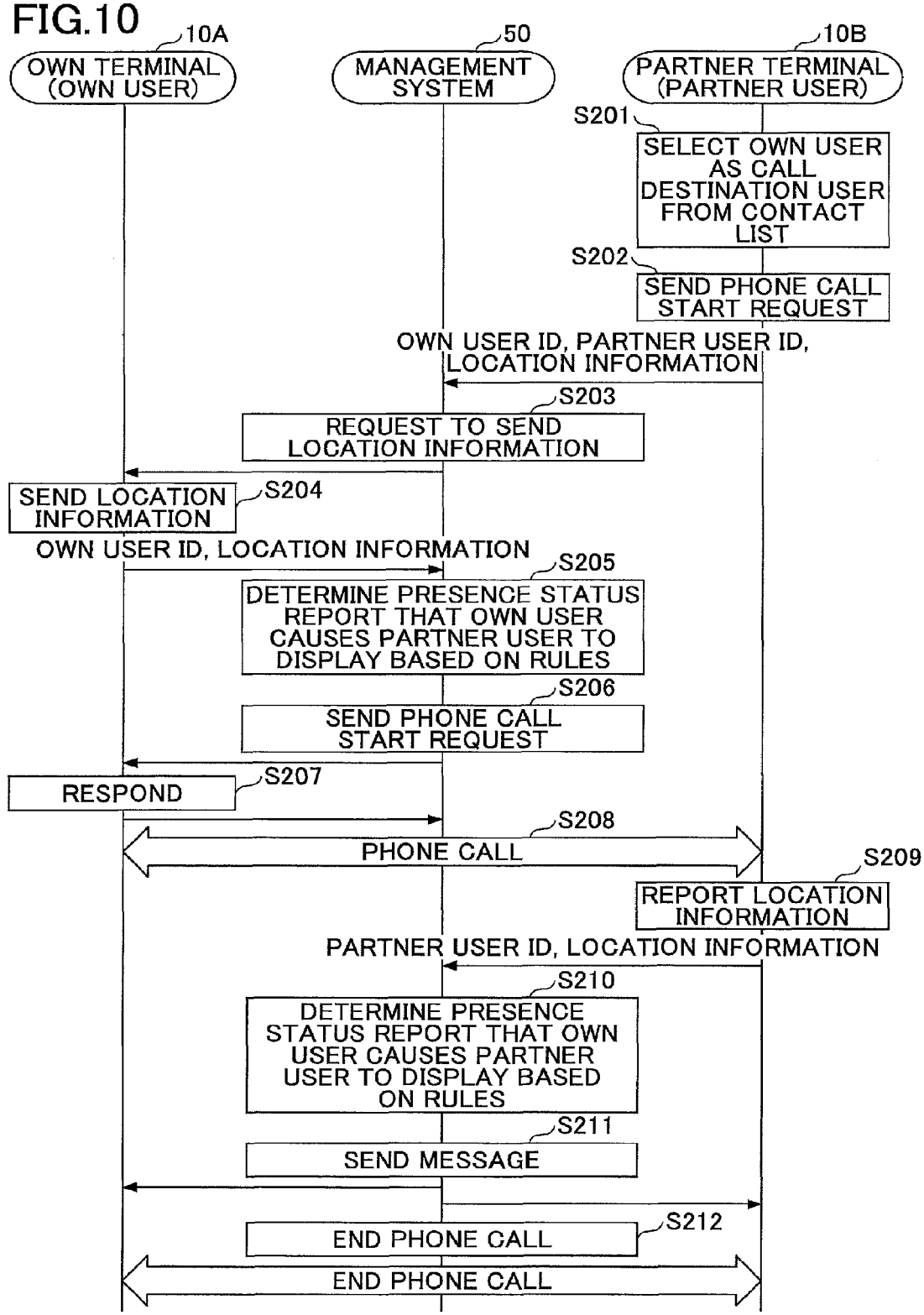

TRANSMISSION MANAGEMENT SYSTEM, TRANSMISSION SYSTEM, TRANSMISSION MANAGEMENT METHOD, AND STORAGE MEDIUM

BACKGROUND OF THE INVENTION

Field of the Invention

The present invention relates to a transmission management system, a transmission system, a transmission management method, and a storage medium.

Description of the Related Art

Remote communication techniques for transmitting and receiving video and audio via the Internet are spreading. There are also techniques for comprehending, before calling, presence information that indicates being temporarily unable to respond, for example, during a log-in, the presence information being set by a user of a terminal device of a destination candidate, in order to avoid uselessness such as finding out, after trying to call up, that the user has logged out from the terminal device of the destination, such that a phone call is impossible.

Further, Patent Document 1 describes, in order to indicate risk of information leakage during a phone call before calling, a technique of displaying the level of risk of information leakage for each destination in a list of destination candidates, based on the current locations of the destinations and the information leakage risk level of each place.

In the related art, regardless of where a partner is, if the presence status of a user of a device is set to be able to receive a phone call, the device may receive an incoming call from a partner terminal device and start a phone call without notification that the information leakage risk level at the location of the partner is high. [Patent Document 1] Japanese Laid-Open Patent Application No. 2013-251812

SUMMARY OF THE INVENTION

It is a general object of at least one embodiment of the present invention to provide a system that reduces information leakage risk.

A transmission management system that controls data transmission between a first transmitting terminal and a second transmitting terminal is provided.

The transmission management system includes a receiving unit that receives location information about the second transmitting terminal and a transmitting unit that transmits first presence information about the first transmitting terminal to the second transmitting terminal depending on first location information about the second transmitting terminal received by the receiving unit, and transmits second presence information about the first transmitting terminal to the second transmitting terminal depending on second location information about the second transmitting terminal received by the receiving unit.

BRIEF DESCRIPTION OF THE DRAWINGS

Other objects and further features of embodiments will become apparent from the following detailed description when read in conjunction with the accompanying drawings, in which:

FIG. 2 is a diagram showing a table that manages rules to determine a presence status report;

FIG. 3 is a diagram showing a location management table;

FIG. 4 is a diagram showing a user management table;

FIG. 5 is a diagram showing a destination list management table;

FIG. 6 is a diagram showing a table that manages a change of a presence status report;

FIG. 8B is a (second) flowchart of a process used to determine and report a presence status report in the management system;

FIG. 10 is a sequence diagram when a transmitting terminal makes a phone call;

DESCRIPTION OF THE PREFERRED EMBODIMENTS

In the following, embodiments of the present invention will be described in detail.

<Overall Structure of Embodiment>

Figure 1:
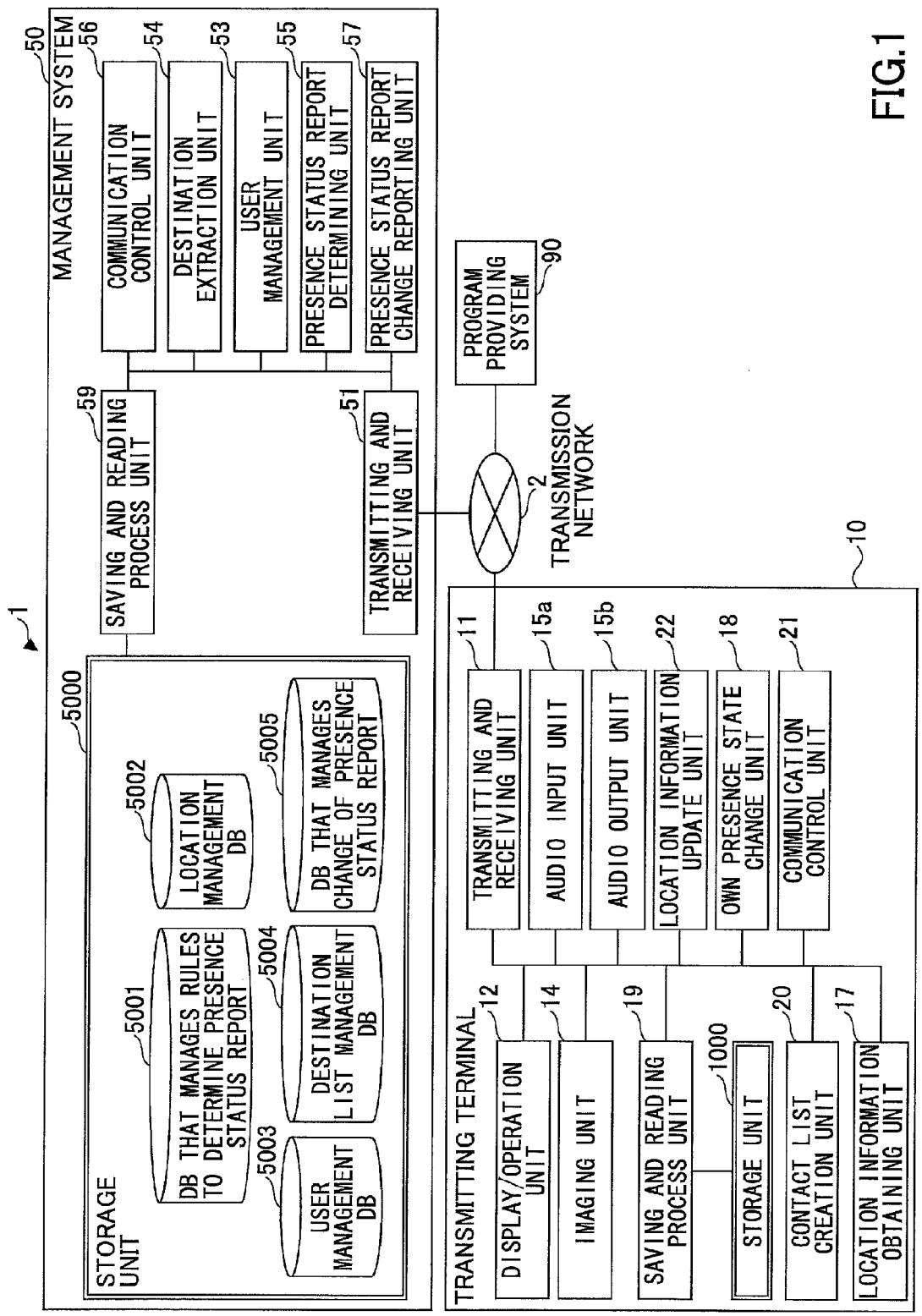
FIG. 1 is a configuration diagram of a transmission system of an embodiment.

FIG. 1 is a configuration diagram of a transmission system 1 as a communication system according to an embodiment.

The transmission system 1 communicatively connects a management system 50 and a program providing system 90 to a terminal 10 via a transmission network 2, the transmission network 2 including the Internet and a mobile phone network.

The transmission system 1 includes a data providing system that transmits content data in one direction from one transmitting terminal to another transmitting terminal via a transmission management system. Further, the transmission management system includes a communication system that mutually communicates information, feelings, and the like among a plurality of transmitting terminals via the transmission management system.

This communication system is for mutually communicating information, feelings, and the like among a plurality of communication terminals (corresponding to the "transmitting terminals") via a communication management system (corresponding to the "transmission management system"). Examples of the communication system include a video conference system, a video call system, an audio conference system, an audio call system, a Personal Computer (PC) screen sharing system, a whiteboard sharing system, and a text chat system.

In the embodiment, the video conference system is used as an example of the communication system, a video conference management system is used as an example of the communication management system, and a video conference terminal is used as an example of the communication terminal.

In the following, the transmission system 1 is described as the video conference system, a transmission management system 50 is described as the video conference management system, and a transmitting terminal 10 is described as the video conference terminal. In other words, the communication system in the embodiment may be applied not only to a video conference system but also to a communication system or to a transmission system.

In the following, the "transmitting terminal" is also described simply as a "terminal" and the "transmission management system" is also described simply as a "management system."

The transmitting terminal 10 transmits and receives various types of information with other devices. For example, the transmitting terminal 10 establishes a session with another terminal 10 and makes a phone call by transmitting and receiving content data including audio data and image data in the established session. In accordance with this, a video conference is realized among a plurality of terminals 10 in the transmission system 1.

In the following, "image data and audio data" are designated as "content data." The content data transmitted between terminals 10 is not limited content data described in the embodiment. Other examples of the content data may be text data or may be image data and audio data including text data. Further, the image data may include a video or a still image. The image data may also include both the video and the still image.

In the transmission system 1 according to the embodiment, when a video conference is to be held, if a user wishing to start the video conference operates a predetermined terminal 10, the operated terminal 10 transmits start request information to the management system 50.

The start request information is a request to start a video conference session and includes information that specifies a session partner terminal 10. In the following, the terminal 10 that transmits the start request information is also referred to as a start request terminal. The partner terminal 10 that is specified as a session partner is also simply referred to as a destination terminal or a destination.

The destination terminal (session partner) may be a single terminal 10 or to two or more terminals 10. In other words, in the transmission system 1, it is possible to realize a video conference using a session established not only between two terminals 10 but also among three or more terminals 10.

Further, in the transmission system 1 according to the embodiment, it is possible for another user to participate in a video conference for which the session has been already established. If the user wishing to participate in the video conference operates a predetermined terminal 10, the operated terminal 10 transmits participation request information to the management system 50, the participation request information specifying the session that has been established (hereafter "established session") and used for the video conference that the user wishes to participate in. In the following, the terminal 10 that transmits the participation request information is referred to as a participation request terminal.

The management system 50 manages the terminals 10 collectively. The management system 50 realizes a video conference such as a phone call between the terminals 10 by establishing a session between the terminals 10.

When the management system 50 receives the start request information for a session from the predetermined terminal 10, the management system 50 establishes the session between the terminal 10 (start request terminal) that transmitted the start request information and a destination terminal and starts the video conference. Further, when the management system 50 receives, from the predetermined terminal 10, the participation request information for a session that is already established (hereafter "established session"), the management system 50 allows the participation request terminal to participate in the established session.

The program providing system 90 includes a Hard Disk (HD) (not shown) that stores a terminal program for causing the terminal 10 to implement various types of functions or various types of units. The program providing system 90 can transmit the terminal program to the terminal 10.

The HD of the program providing system 90 also stores a transmission management program for causing the management system 50 to implement various types of functions or various types of units. The program providing system 90 can transmit the transmission management program to the management system 50.

<Functional Configuration in Embodiment>
<<Functional Configuration of Management System>>

As shown in FIG. 1, the management system 50 includes a transmitting and receiving unit 51, a user management unit 53, a destination extraction unit 54, a presence status report determining unit 55, a communication control unit 56, and a saving and reading process unit 59. Each of these units is a function implemented by a CPU 201 that executes the transmission management program loaded in a RAM 203 from an HD 204. Further, the management system 50 includes a storage unit 5000 configured with the HD 204.

(Table Managing Rules to Determine Presence Status Report)

FIG. 2 is a diagram showing a table that manages rules to determine a presence status report. In the storage unit 5000, a DB 5001 that manages rules to determine a presence status report is built, the DB 5001 having the table that manages rules to determine a presence status report as shown in FIG. 2.

In the table that manages rules to determine a presence status report, for each user ID of each transmitting terminal 10, a setting number, a location of an own user, a location of a partner user, time, a partner user ID, an own presence status, and a presence status report are associated and managed.

The own presence status indicates a presence status (presence information) of each user set by each user or detected by the management system 50. The presence status report indicates a presence status of an own user to be reported to a partner user who includes the own user in a destination list, the presence status of the own user being determined in accordance with rules set in the table that manages rules to determine a presence status report.

The set rules are evaluated in order of the setting numbers, and only a rule that matches first is used.

The rule for setting number 5 for a user ID "01aa" shown in FIG. 2 reports "offline" as a presence status of the own user to a partner terminal, which includes the own user in the destination list, regardless of other items if an own terminal is located at home. The rule for setting number 6 reports "unable to respond" to a partner user located somewhere other than in an office from 10:00 to 11:00 on Mondays, so it will ignore a partner user located somewhere other than in the office, for example, due to a regular meeting that deals with confidential information. The rule for setting number 7 reports "unable to respond" from 12:00 to 13:00 every day due to a lunch break, for example. The rule for setting number 8 reports "unable to respond" to a partner user other than a partner user with an ID "01ab" or "01ba" from 13:00 to 14:00 on Wednesdays due to a regular meeting with the partner users with the IDs "01ab" and "01ba." The rule for setting number 9 reports "unable to respond" to a partner user other than a partner user with an ID "01bb" regardless of other items if the own terminal is located in company A so as to respond to only an emergency contact from a supervisor at a customer site, for example.

In the table that manages rules to determine a presence status report, the user of each transmitting terminal 10 can set rules for his own terminal 10 using an application of the terminal 10 or the Web.

(Location Management Table)

FIG. 3 is a diagram showing a location management table. In the storage unit 5000, a location management DB 5002 including the location management table as shown in FIG. 3 is built.

In the location management table, for each user ID of each transmitting terminal 10, a location and a location area are associated and managed. In the location management table, the user of each transmitting terminal 10 registers items based on information about a current location or by selecting on a map using an application of the terminal 10 or the Web.

In addition, information in the table that manages rules to determine a presence status report and information in the location management table may be integrated. In other words, in the table that manages rules to determine a presence status report, a location area of the own terminal and a location area of the partner terminal may be set instead of the location of the own user and the location of the partner user.

(User Management Table)

FIG. 4 is a diagram showing a user management table. In the storage unit 5000, a user management DB 5003 including the user management table as shown in FIG. 4 is built.

In the user management table, for each user ID of each transmitting terminal 10, a user name, an own presence status, an IP address of the transmitting terminal 10, location information, and a location information reception date and time are associated and managed.

For example, in the user management table shown in FIG. 4, a user name for a user ID "01aa" is "Reiji ABE," an own presence status is "able to respond," an IP address of a transmitting terminal 10*aa* is "1.2.1.3," location information is "N:35.521166, E:139.720745," and a location information reception date and time is "2015.01.26.15:25."

In the user management table, a unique user ID is set upon registration with the transmission system 1. The user name is registered or changed by an administrator of the management system 50 or a user of the transmitting terminal 10. In addition, the user name may be registered or changed in response to a request sent from the transmitting terminal 10 to the management system 50.

(Destination List Management Table)

FIG. 5 is a diagram showing a destination list management table. In the storage unit 5000, a destination list management DB 5004 including the destination list management table as shown in FIG. 5 is built.

In the destination list management table, a report destination user ID and a destination user ID are associated and managed. The report destination indicates a transmitting terminal that receives a presence status report included in a contact list from the management system 50. Further, the destination indicates a user to which the report destination can make a transmission request. The destination is a user registered as a destination candidate.

For example, the destination list management table in FIG. 5 shows that the transmitting terminal 10*aa* with the user ID "01aa" can send a request for a start of a video conference to destination terminals including a transmitting terminal 10*ab* with a user ID "01ab," a transmitting terminal 10*ba* with a user ID "01ba," a transmitting terminal 10*db* with a user ID "01db," a transmitting terminal 10*dc* with a user ID "01dc," a transmitting terminal 10*ca* with a user ID "01ca," and a transmitting terminal 10*cb* with a user ID "01cb." Candidates for destination terminals are added or deleted in response to a request sent from the terminal 10 to the management system 50.

(Table Managing Change of Presence Status Report)

FIG. 6 is a diagram showing a table that manages a change of a presence status report. In the storage unit 5000, a DB 5005 that manages a change of a presence status report is built, the DB 5005 having the table that manages a change of a presence status report as shown in FIG. 6.

In the table that manages a change of a presence status report, a partner user ID, an own user ID, a presence status report of an own user for the partner user, and a setting number are associated and managed.

For example, if a presence status report of the own user with the user ID "01aa" is determined as "unable to respond" in accordance with the rule for setting number 6 for the user ID "01aa" in the table that manages rules to determine a presence status report as shown in FIG. 2, and this is reported to a partner user with the user ID "01db," the "01db" is stored for the partner user ID, the "01aa" is stored for the own user ID, the "unable to respond" is stored for the presence status report of the own user for the partner user, and the "6" is stored for the setting number as shown in FIG. 6.

Returning to FIG. 1, the presence status report determining unit 55 is configured with the CPU 201. The presence status report determining unit 55 determines, for each partner user, the presence status report of the own user to be included in a destination list in the partner user by using the table that manages rules to determine a presence status report in FIG. 2, the location management table in FIG. 3, the user management table in FIG. 4, and the destination list management table in FIG. 5.

A presence status report change reporting unit 57 is constituted with the CPU 201. The presence status report change reporting unit 57 compares a partner user ID, an own user ID, and a presence status report of the own user for the partner user determined by the presence status report determining unit 55 with the partner user ID, the own user ID, and the presence status report of the own user for the partner user stored in the table that manages a change of a presence status report in FIG. 6. Only if the presence status report of the own user for the partner user is changed, the presence status report change reporting unit 57 reports the presence status report of the own user to the transmitting terminal 10 with the partner user ID and updates the table that manages a change of a presence status report in FIG. 6.

The user management unit 53 is constituted with the CPU 201. The user management unit 53 manages information about a user of each transmitting terminal 10 in the user management table in FIG. 4. If the user of the transmitting terminal 10 logs in, the user management unit 53 changes the own presence status of the user to "able to respond." If the user of the transmitting terminal 10 logs out, the user management unit 53 changes the own presence status of the user to "offline." Further, if a report of "unable to respond," "able to respond," or "on the phone" is received from the user of the transmitting terminal 10, the user management unit 53 changes the own presence status of the user to the "unable to respond," "able to respond," or "on the phone." In addition, if a start of a phone call or an end of a phone call by the user of the transmitting terminal 10 is detected in the management system 50, the user management unit 53 may automatically change the own presence status of the user to "on the phone call" or "able to respond."

Further, if a user ID and location information are received from each transmitting terminal 10, the user management unit 53 manages the location information corresponding to the user ID and date and time when the location information is received.

Further, if the user ID and information about an IP address are received from each transmitting terminal 10, the user management unit 53 manages the IP address corresponding to the user ID.

The destination extraction unit 54 is constituted with the CPU 201. The destination extraction unit 54 searches the destination list management DB 5004 (see FIG. 5) using a user ID of a requestor terminal as a search key, the requestor terminal sending a log-in request, and extracts user IDs of destination candidates with respect to the requestor terminal. Further, the destination extraction unit 54 searches the destination list management DB 5004 (see FIG. 5) using the user ID of the requestor terminal as a search key, the requestor terminal sending the log-in request, and extracts user IDs of other requestor terminals that registered the user ID of the requestor terminal as a destination candidate.

The communication control unit 56 is configured with the CPU 201. The communication control unit 56 performs a process of communication related to a phone call between transmitting terminals.

The transmitting and receiving unit 51 is constituted with the CPU 201 and a network I/F 209. The transmitting and receiving unit 51 transmits or receives various types of data or information with another transmitting terminal 10, a device 30, or the program providing system 90 via the transmission network 2.

The saving and reading process unit 59 is constituted with the CPU 201 and an HDD 205. The saving and reading process unit 59 saves various types of data in the storage unit 5000 and reads various types of data stored in the storage unit 5000.

<<Functional Configuration of Transmitting Terminal>>

The transmitting terminal 10 may be a terminal such as a smartphone, a mobile phone, a tablet, a laptop computer, or a desktop computer. The transmitting terminal 10 includes a location information obtaining unit 17, an own presence status change unit 18, a contact list creation unit 20, a communication control unit 21, a transmitting and receiving unit 11, a display/operation unit 12, an imaging unit 14, an audio input unit 15a, an audio output unit 15b, and a saving and reading process unit 19.

Each of these units is a function implemented by a CPU 101 that executes a transmitting terminal control program loaded in a RAM 103 from a flash memory 104. Further, the transmitting terminal 10 includes a storage unit 1000 configured with the RAM 103 and the flash memory 104.

The location information obtaining unit 17 is configured with the CPU 101, a GPS 119, and a network I/F 111. The location information obtaining unit 17 uses information from a GPS satellite or a wireless LAN access point to obtain current location information.

A location information update unit 22 obtains location information using the location information obtaining unit 17 and reports the location information to the management system 50 via the transmitting and receiving unit 11 while being logged in, at certain intervals, or upon detecting that the transmitting terminal 10 has moved a predetermined distance using the GPS 119, the network I/F 111, or an acceleration sensor 121.

The own presence status change unit 18 is configured with the CPU 101. The own presence status change unit 18 reports an own presence status to the management system 50 via the transmitting and receiving unit 11. For example, the own presence status change unit 18 obtains location information using the location information obtaining unit 17 upon powering-on or a log-in operation on a touch panel 120 and transmits a log-in request including a user ID, an IP address of an own terminal, and location information at that moment. Further, the own presence status change unit 18 transmits a log-out request including the user ID upon powering-off or a log-out operation on the touch panel 120. Further, the own presence status change unit 18 transmits presence status change request information including the user ID and a selected presence status upon an operation to select the presence status on the touch panel 120.

Own presence statuses to be selected by the user include "able to respond," "unable to respond," "on the phone," and the like. Further, for the presence statuses, various statuses may be selected such that while sound is output, an image is not output or sound is not output (mute).

The contact list creation unit 20 creates and updates a contact list where a presence status report for each destination user is displayed with an icon based on contact list information received from the management system 50 and displays the contact list on the display/operation unit 12. Further, the contact list creation unit 20 may create the contact list while sorting destination terminals based on presence status reports, the destination terminals being included in the contact list. For example, the destination terminals may be sorted from top in order of destination terminals that are "able to respond," destination terminals that are "unable to respond," destination terminals that are "on the phone," and destination terminals that are "offline."

The communication control unit 21 is configured with the CPU 101. The communication control unit 21 performs control that prohibits calling destination users whose presence status report in the contact list is not "able to respond."

The transmitting and receiving unit 11 is configured with the CPU 101 and the network I/F 111. The transmitting and receiving unit 11 transmits or receives various types of data or information with another transmitting terminal 10, the device 30, the program providing system 90, or the management system 50 via the transmission network 2.

The display/operation unit 12 is configured with the CPU 101, the touch panel 120, an operation button 108, and a power switch 109. The display/operation unit 12 receives various types of inputs by the user and displays information such as the contact list on the touch panel 120.

The imaging unit 14 is configured with the CPU 101, a camera 112, and an imaging device I/F 113. The imaging unit 14 captures an image of an object and outputs image data obtained by the capturing to the transmitting and receiving unit 11.

The audio input unit 15a is configured with the CPU 101 and an audio input and output I/F 116. An audio signal that represents sound obtained by collecting sound using a microphone 114 is input to the audio input unit 15a and the audio input unit 15a converts the input audio signal to audio data.

The audio output unit 15b is configured with the CPU 101 and the audio input and output I/F 116. The audio output unit 15b converts audio data to an audio signal and causes a loudspeaker 115 to output sound by outputting the converted audio signal to the loudspeaker 115.

The saving and reading process unit 19 is configured with the CPU 101 and an SSD 105. The saving and reading process unit 19 saves various types of data in the storage unit 1000 and reads various types of data stored in the storage unit 1000.

The storage unit 1000 stores a user ID which is an identifier used to identify the transmitting terminal 10 or a user of the transmitting terminal 10 and a password, for example. In addition, the user ID may be information by which the transmitting terminal 10 can be identified. The user ID is not necessarily stored in the transmitting terminal 10. For example, the user ID may be an ID input by the user to the transmitting terminal 10. Further, the storage unit 1000 is used as a reception buffer for image data and audio data received when a video conference is held with a destination terminal.

<Operation>

In the following, an operation of the transmission system 1 according to the embodiment is described. In the following description, a user that receives and displays a contact list is referred to as a partner user.

Figure 7:
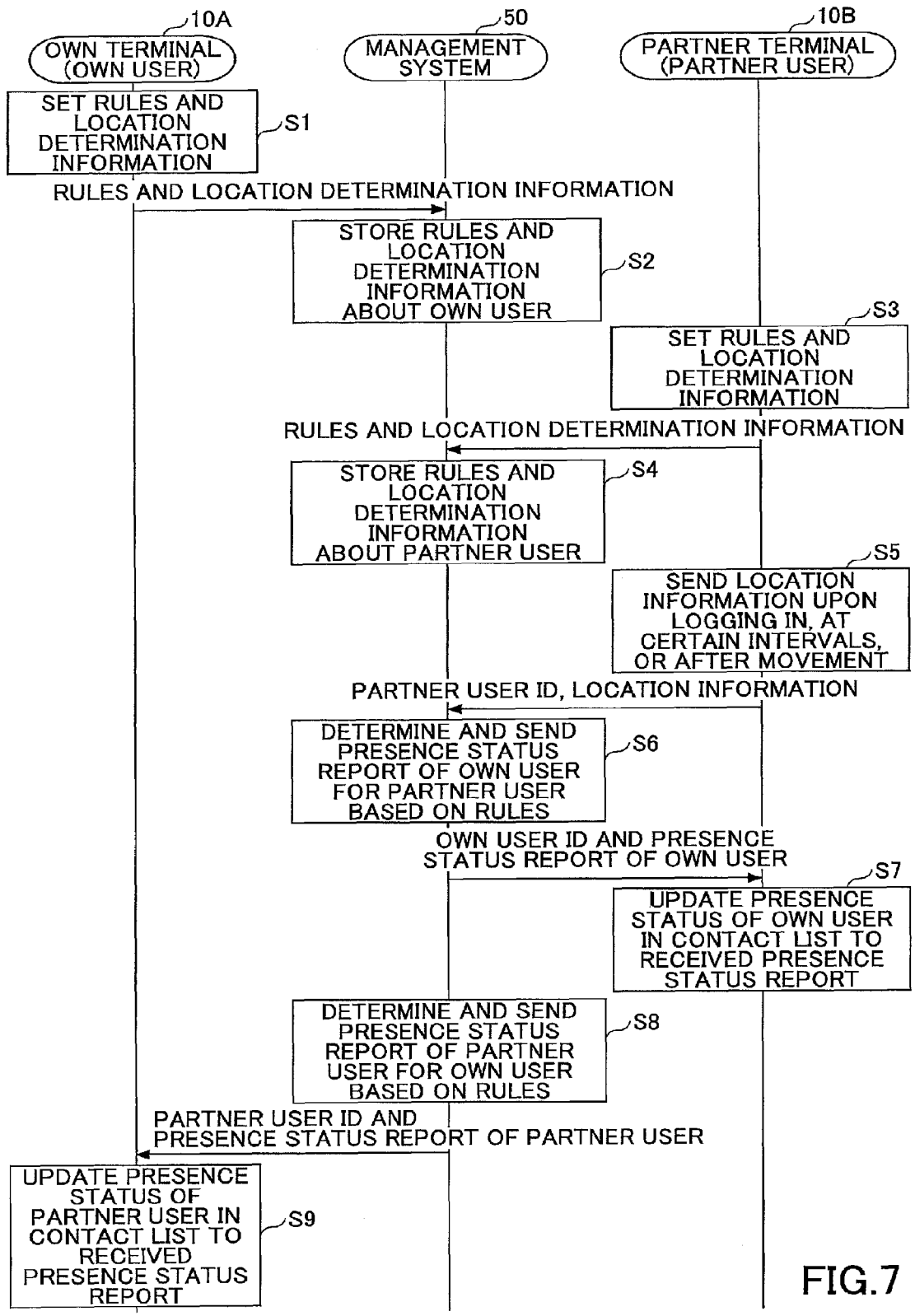
FIG. 7 is a sequence diagram when a transmitting terminal obtains a contact list.

FIG. 7 is a sequence diagram that schematically shows a process where the transmitting terminal 10 obtains the contact list.

An own user who wishes to cause a partner user to display an own presence status sets, in the DB 5001 (FIG. 2) that manages rules to determine a presence status report in the management system 50, rules to determine the presence status report including a setting number, a location of the own user, a location of the partner user, time, a partner user ID, the own presence status, and a presence status report in association with an own user ID. Further, the own user sets, in the location management DB 5002 (FIG. 3), location determination information including a location and a location area in association with the own user ID (step S1).

The management system 50 stores the rules to determine the presence status report and the location determination information that are set in association with the own user ID (step S2).

A partner user sets partner user rules to determine a presence status report and location determination information in the same manner (step S3) and saves the rules to determine a presence status report and the location determination information in the management system 50 (step S4).

A partner transmitting terminal 10B used by the partner user transmits a request including location information about the partner transmitting terminal 10B to the management system 50 upon logging in, at certain intervals while being logged in, or after moving to a predetermined distance, for example (step S5).

The management system 50 determines a presence status report that the own user causes the partner user to display based on the rules to determine the presence status report including the location of the own user, the location of the partner user, the time, the partner user ID, and the own presence status. The management system 50 reports the own user ID and the determined presence status report of the own user to the partner transmitting terminal 10B (step S6).

The partner transmitting terminal 10B updates a presence status of the own user displayed in a contact list to the received presence status report (step S7).

The management system 50 also determines a presence status report that the partner user causes the own user to display based on rules to determine the presence status report of the partner user. The management system 50 reports the partner user ID and the determined presence status report of the partner user to an own transmitting terminal 10A (step S8).

The own transmitting terminal 10A updates a presence status of the partner user displayed in a contact list to the received presence status report (step S9).

Figure 8A:
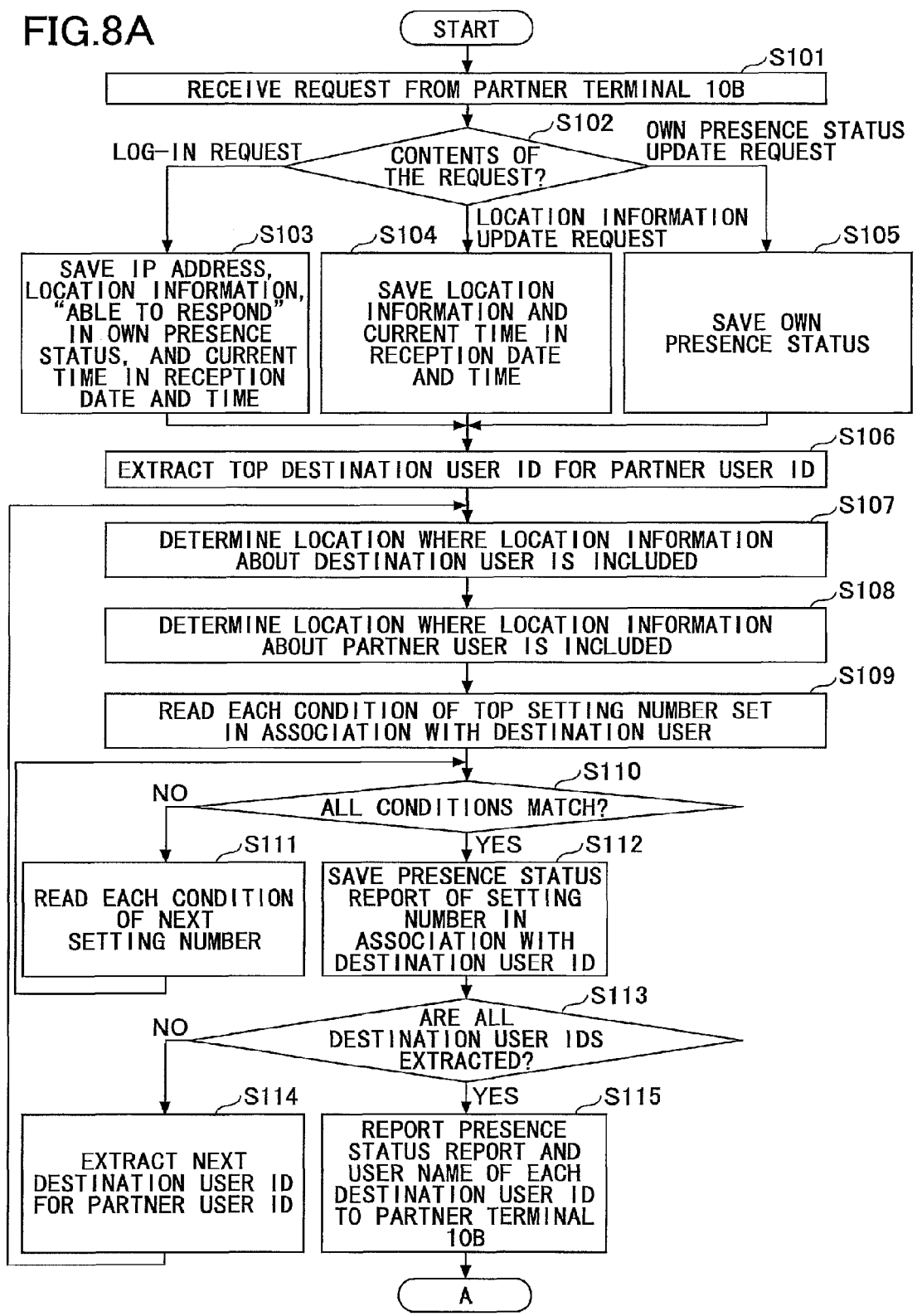
FIG. 8A is a (first) flowchart of a process used to determine and report a presence status report in a management system.

FIGS. 8A and 8B are flowcharts of processes to determine and report the presence status report in the management system 50.

With reference to FIG. 8A, the process in which the partner user obtains a contact list including the own user as a destination user is described. First, the transmitting and receiving unit 51 receives a request from the partner transmitting terminal 10B (step S101).

The user management unit 53 checks the contents of the request (step S102). If the request is a log-in request, the user management unit 53 obtains a user ID, an IP address, and location information included in the log-in request, saves the IP address and the location information in association with the obtained user ID of the partner user, and also saves "able to respond" in the "own presence status" and the current time in the "location information reception date and time" in the user management DB 5003 (step S103). In accordance with this, in the user management table, information about the partner user is stored such that the user ID is "01aa," the IP address of the transmitting terminal 10*aa* is "1.2.1.3," the own presence status is "able to respond," the location information is "N:35.521166, E:139.720745," and the location information reception date and time is "2015.01.26.15:25" as shown in FIG. 4. If the request is a location information update request, the user management unit 53 obtains a user ID and location information included in the location information update request, saves the location information in association with the obtained user ID of the partner user, and also saves the current time in the "location information reception date and time" in the user management DB 5003 (step S104). If the request is an own presence status update request, the user management unit 53 obtains a user ID and an own presence status included in the own presence status update request and saves the own presence status of the partner user in association with the obtained user ID of the partner user in the user management DB 5003 (step S105).

Then the destination extraction unit 54 searches the destination list management DB 5004 (see FIG. 5) using a partner user ID which is the user ID of the partner user as a report destination user ID and extracts a top destination user ID for the report destination user ID (step S106). In FIG. 5, if the report destination user ID is "01aa," destination user IDs "01ab," "01ba," "01db," "01dc," "01ca," and "01cb" will be extracted in order.

Then the presence status report determining unit 55 obtains, from the user management DB 5003, location information about the destination user for the extracted destination user ID and determines a location that corresponds to a location area where the location information is included, the location area being set in association with the destination user in the location management table shown in FIG. 3 (step S107).

Further, the presence status report determining unit 55 also obtains, from the user management DB 5003, location information about the partner user and determines a location that corresponds to a location area where the location information is included, the location area being set in association with the destination user in the location management table shown in FIG. 3 (step S108).

Then in the table that manages rules to determine a presence status report shown in FIG. 2, the presence status report determining unit 55 reads each condition of a top setting number set in association with the destination user (step S109). The presence status report determining unit 55 determines whether each of the conditions in the setting number, including the location of an own user, the location of a partner user, the time, the partner user ID, and the own presence status matches while setting the location where the location information about the destination user is included as the "location of an own user" and setting the location where the location information about the partner user is included as the "location of a partner user" (step S110). If the conditions do not match (NO in step S110), the presence status report determining unit 55 reads each condition of a next setting number (step S111) and performs the process in step S110. In addition, in a last setting number, a presence status report if the conditions of all the setting numbers do not match is set. If the conditions match (YES in step S110), the presence status report determining unit 55 saves a presence status report in association with the corresponding destination user ID, the presence status report being set in the setting number (step S112).

Whether all the destination user IDs are extracted is determined (step S113). If there is a destination user ID that has not been extracted (NO in step S113), the destination extraction unit 54 searches the destination list management DB 5004 (see FIG. 5) using the user ID of the partner user as a search key and extracts a next destination user ID for the partner user ID (step S114). Then the process from step S107 is performed. If all the destination user IDs are extracted (YES in step S113), the presence status report change reporting unit 57 compares the determined presence status report with the presence status report of the own user for the partner user stored in the table that manages a change of a presence status report shown in FIG. 6. Only for those changed presence status reports, the presence status report change reporting unit 57 reports the presence status report of a corresponding destination user ID and a user name of the destination user ID obtained from the user management DB 5003 to the partner transmitting terminal 10B. The presence status report change reporting unit 57 also updates the table that manages a change of a presence status report in FIG. 6 (step S115). In accordance with this, the partner transmitting terminal 10B displays the presence status report of own users as destination users in each user name.

With reference to FIG. 8A, the process in which the own user that registered the partner user in a destination list obtains a contact list including a presence status report of the partner user is described.

The destination extraction unit 54 searches the destination list management DB 5004 (see FIG. 5) using the partner user ID as a search key and extracts a top user ID among own users that registered the partner user ID as a destination user ID (step S116). In FIG. 5, if the partner user ID is "01aa," own user IDs "01ab," "01ba," and "01db" that registered "01aa" as a destination user ID will be extracted in order.

Then the presence status report determining unit 55 obtains, from the user management DB 5003, location information about the own user for the extracted own user ID and determines a location that corresponds to a location area where the location information is included, the location area being set in association with the partner user in the location management table shown in FIG. 3 (step S117).

Further, the presence status report determining unit 55 also obtains, from the user management DB 5003, location information about the partner user and determines a location that corresponds to a location area where the location information is included, the location area being set in association with the partner user in the location management table shown in FIG. 3 (step S118).

Then in the table that manages rules to determine a presence status report shown in FIG. 2, the presence status report determining unit 55 reads each condition of a top setting number set in association with the partner user (step S119). The presence status report determining unit 55 determines whether each of the conditions in the setting number including the location of an own user, the location of a partner user, the time, the partner user ID, and the own presence status all matches while setting the location where the location information about the partner user is included as the "location of an own user" and setting the location where the location information about the own user is included as the "location of a partner user" (step S120). If the conditions do not match (NO in step S120), the presence status report determining unit 55 reads each condition of a next setting number (step S121) and performs the process in step S120. In addition, in a last setting number, a presence status report if the conditions of all the setting numbers do not match is set. If the conditions match (YES in step S120), the presence status report change reporting unit 57 compares the determined presence status report with the presence status report of the own user for the partner user stored in the table that manages a change of a presence status report shown in FIG. 6 in which the partner user ID is set as the "own user ID" and the own user ID is set as the "partner user ID." Only if the determined presence status report changes, the presence status report change reporting unit 57 reports the presence status report set in a corresponding setting number, the partner user ID, and a corresponding user name of the partner user obtained from the user management DB 5003 to the transmitting terminal 10 of the report destination user and updates the table that manages a change of a presence status report shown in FIG. 6 (step S122). In accordance with this, the transmitting terminal 10 of the own user displays the user name of the partner user and its presence status report.

Then whether all the report destination user IDs are extracted is determined (step S123).

If there is a report destination user ID that has not been extracted (NO in step S123), the destination extraction unit 54 searches the destination list management DB 5004 (see FIG. 5) using the user ID of the requestor as a search key and extracts a next report destination user ID among report destination users that is to receive the presence status report of the requestor user and that registered the user ID of the requestor as a destination user ID (step S124) and the process from step S117 is performed. If all the report destination user IDs are extracted (YES in step S123), the process ends.

Figure 9A:
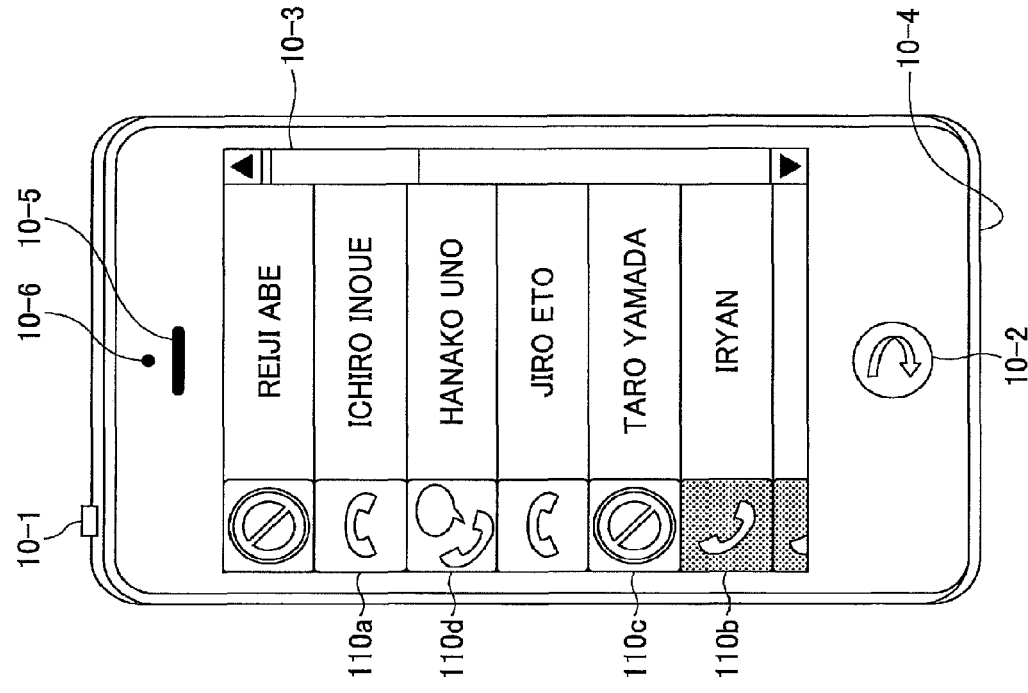
FIG. 9A is a diagram showing a contact list displayed in a partner transmitting terminal before movement.

FIG. 9A is a diagram showing a contact list displayed in the transmitting terminal 10 before movement. If a status of a destination user is "able to respond," the contact list creation unit 20 assigns an "able to respond" icon 110b to the destination user. If the status of the destination user is "unable to respond," the contact list creation unit 20 assigns "unable to respond" icon 110c. If the status of the destination user is "offline," the contact list creation unit 20 assigns an "offline" icon 110a. If the status of the destination user is "on the phone," the contact list creation unit 20 assigns an "on the phone" icon 110d. Although the icons are assigned here, for example, characters or symbols may be assigned instead.

Figure 9B:
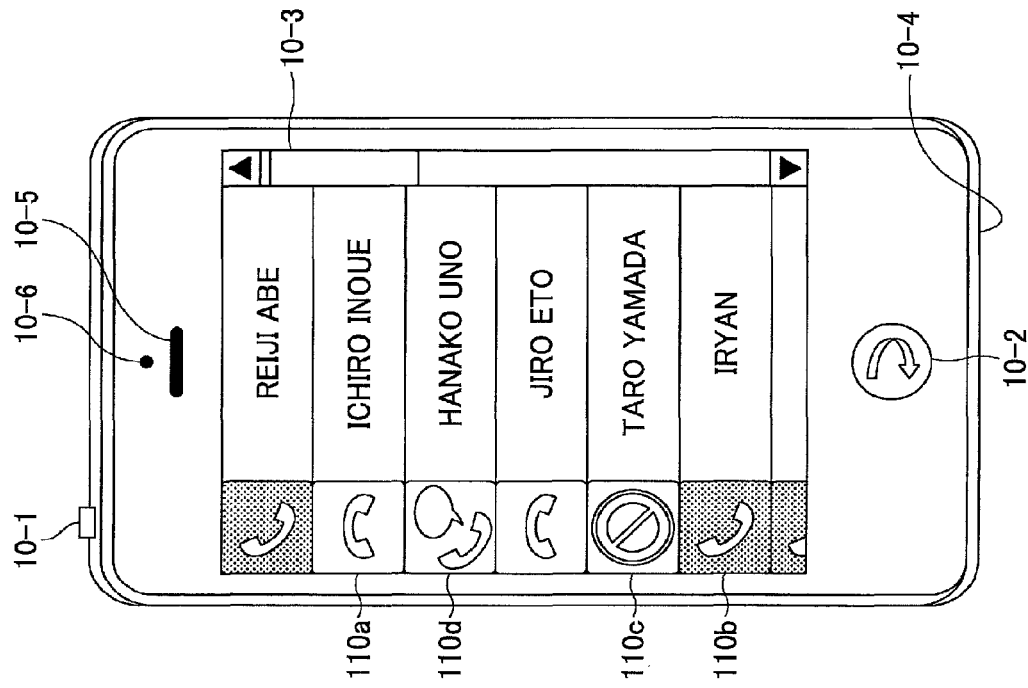
FIG. 9B is a diagram showing a contact list displayed in a partner transmitting terminal after movement.

For example, it is assumed that in the destination list management table, "Reiji ABE" with the user ID "01aa" is registered as a destination user ID for "Taro YAMADA" with a user ID "01db" as shown in FIG. 5. When the current location of Taro YAMADA has moved from a position included in the area of the "office" set by Reiji ABE in the location management table of FIG. 3 to a position not included in that area, if the current location of Taro YAMADA is N:35.667112, E:139.763179 and the current time is Monday, 10:30, and an own presence status of the Reiji ABE is "able to respond" in the user management table as shown in FIG. 4, this case matches the setting number 6 for the user ID "01aa" in the table that manages rules to determine a presence status report in FIG. 2 and a corresponding presence status report of Reiji ABE to be reported to Taro YAMADA is determined to be "unable to respond." The "unable to respond" icon is displayed for Reiji ABE in a contact list of the Taro YAMADA's terminal as shown in FIG. 9B.

FIG. 10 is a sequence diagram when the transmitting terminals 10 perform a phone call. In the following example, an own user receives an incoming call from a partner user to have a phone call.

First, the partner user of the partner transmitting terminal 10B selects the own user as a call destination user from a contact list that is displayed on the partner transmitting terminal 10B (step S201). In this case, the communication control unit 21 of the partner transmitting terminal 10B performs a control that prohibits calling if a presence status report of the own user in the contact list is not "able to respond."

If the presence status report of the own user is "able to respond," the communication control unit 21 transmits a phone call start request including an own user ID, a partner user ID, and location information about the partner transmitting terminal 10B to the management system 50 (step S202).

The management system 50 sends a request to transmit location information to the own transmitting terminal 10A (step S203).

The own transmitting terminal 10A transmits the location information to the management system 50 (step S204).

The presence status report determining unit 55 of the management system 50 determines a presence status report that the own user causes the partner user to display based on the rules to determine the presence status report including the location of the own user, the location of the partner user, the time, the partner user ID, and the own presence status (step S205). If the presence status report of the own user for the partner user is "able to respond," the presence status report determining unit 55 transmits the phone call start request to the own transmitting terminal 10A (step S206). In contrast, if the presence status report is not "able to respond," the presence status report determining unit 55 returns a rejection response for the phone call start request and reports a presence status report of the own user for the partner user to the partner transmitting terminal 10B so as to update a contact list. The management system 50 confirms whether the presence status report of the own user for the partner user is "able to respond" in this manner because time has passed since the presence status report of the own user was reported to the partner transmitting terminal 10B and the conditions of the location of the own user, the location of the partner user, and the time in the rules to determine a presence status report may not match.

Upon receiving the phone call start request, the own transmitting terminal 10A reports an incoming call to the own user. Upon receiving a response operation from the own user, the own transmitting terminal 10A transmits a phone call response to the management system 50 (step S207).

In accordance with this, a phone call starts between the own user and the partner user (step S208).

During the phone call, if movement of the own transmitting terminal 10A or the partner transmitting terminal 10B is detected, for example, location information is reported to the management system 50 (step S209).

The management system 50 determines a presence status report that the own user causes the partner user to display based on the rules to determine the presence status report (step S210). If the presence status report of the own user for the partner user is not "able to respond," the communication control unit 56 reports that the presence status report is no longer "able to respond" and sends an audio or character message to indicate a reason thereof to the own transmitting terminal 10A and the partner transmitting terminal 10B. In the case of becoming no longer "able to respond" due to a location change of the partner user, a message such as "the phone call will end unless you return to your previous position within one minute" is sent (step S211).

The management system 50 ends the phone call between the own user and the partner user if the presence status report of the own user for the partner user is not "able to respond" even after the reported period has elapsed (step S212). By contrast, if the presence status report of the own user for the partner user returns to "able to respond" within the reported period, the management system 50 sends an audio or character message to indicate this to the own transmitting terminal 10A and the partner transmitting terminal 10B and continues the phone call.

In addition, in step S211 and step S212, instead of sending the message and ending the phone call after a predetermined period has elapsed, the message may be sent after ending the phone call. In the case of becoming no longer "able to respond" due to the location change of the partner user, a message such as "the phone call ended because you are out of a predetermined location" is sent.

Figure 11:
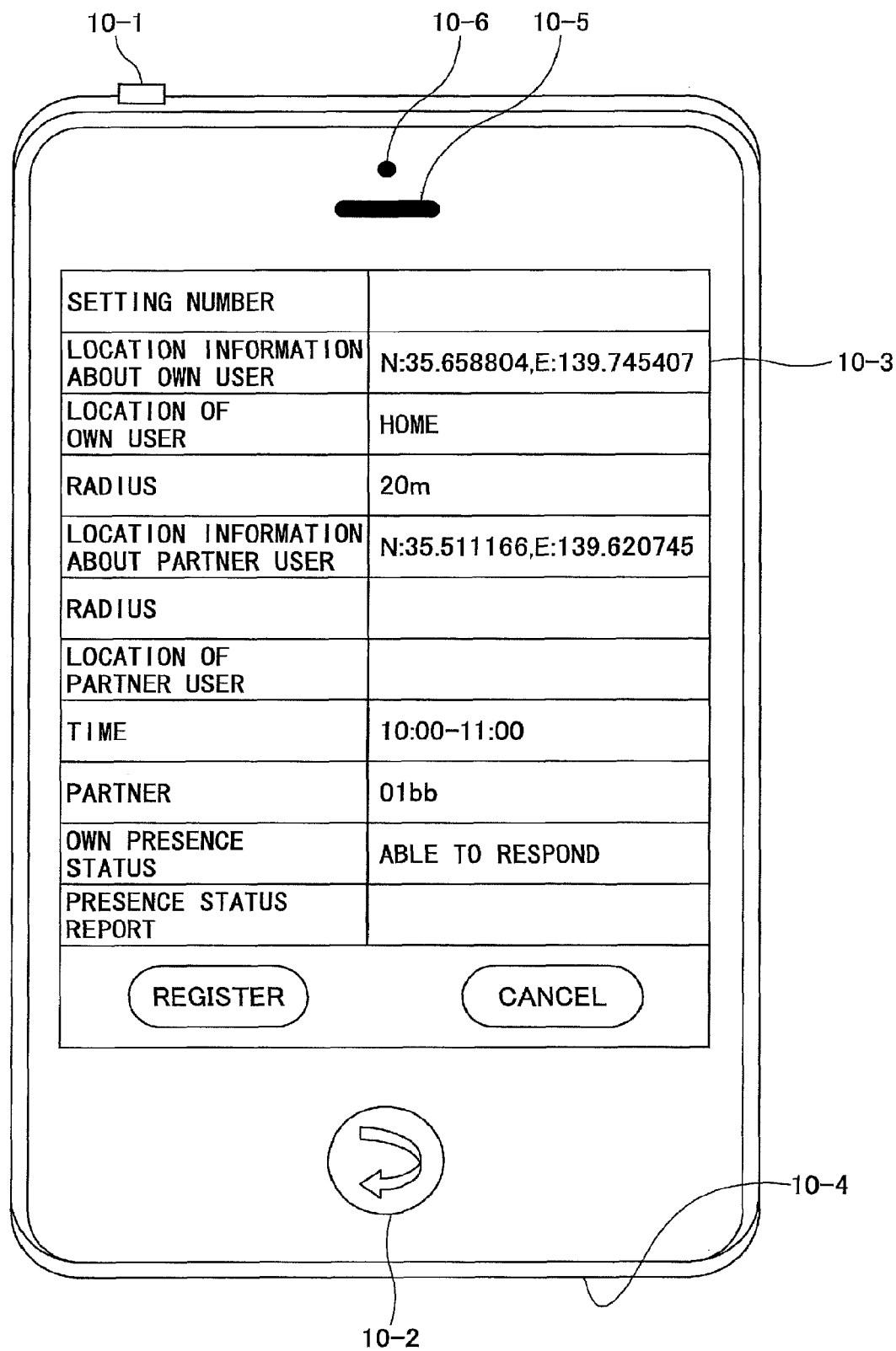
FIG. 11 is a diagram showing a screen that registers rules to determine a presence status report, the screen being displayed on a transmitting terminal.

FIG. 11 is a diagram showing a screen that registers rules to determine a presence status report, the screen being displayed on the transmitting terminal 10. If a phone call between the own user and the partner user ends or if the own user does not respond to an incoming call from the partner user, the communication control unit 21 of the transmitting terminal 10 displays a dialog screen that confirms whether to register the situation of this phone call or incoming call with the table that manages rules to determine a presence status report. When a predetermined operation is received from the own user, the communication control unit 21 transmits a request to the management system 50 and obtains, from the communication control unit 56 of the management system 50, a location of the own user, a location of the partner user, time, a partner user ID, and an own presence status in the latest phone call or incoming call. The communication control unit 21 displays the registration screen that sets information about items of the location of the own user, the location of the partner user, the time, the partner user ID, and the own presence status obtained from the management system 50 as shown in FIG. 11. Then the own user modifies the items of the location of the own user, the location of the partner user, the time, the partner user ID, and the own presence status where necessary and sets a setting number and a presence status report. When the own user presses a registration button, the information is registered in the table that manages rules to determine a presence status report in the management system 50 by transmitting a registration request including the own user ID, the setting number, the location of the own user, the location of the partner user, the time, the partner user ID, the own presence status, and the presence status report.

In addition, in case of emergency, even if the presence status report of the own user in the contact list is not "able to respond" in step S201, calling may be possible, and the management system 50 may transmit, to the own transmitting terminal 10A, a phone call start request including a message that indicates calling from a partner for which the presence status report of the own user is not "able to respond." The own transmitting terminal 10A may display this message on an incoming call screen.

The user ID is not limited to an identifier to identify the user of the transmitting terminal 10 but may be an identifier (terminal ID) to identify the transmitting terminal 10.

<Hardware Configuration in Example>

In the following, a hardware configuration of the embodiment is described.

Figure 12:
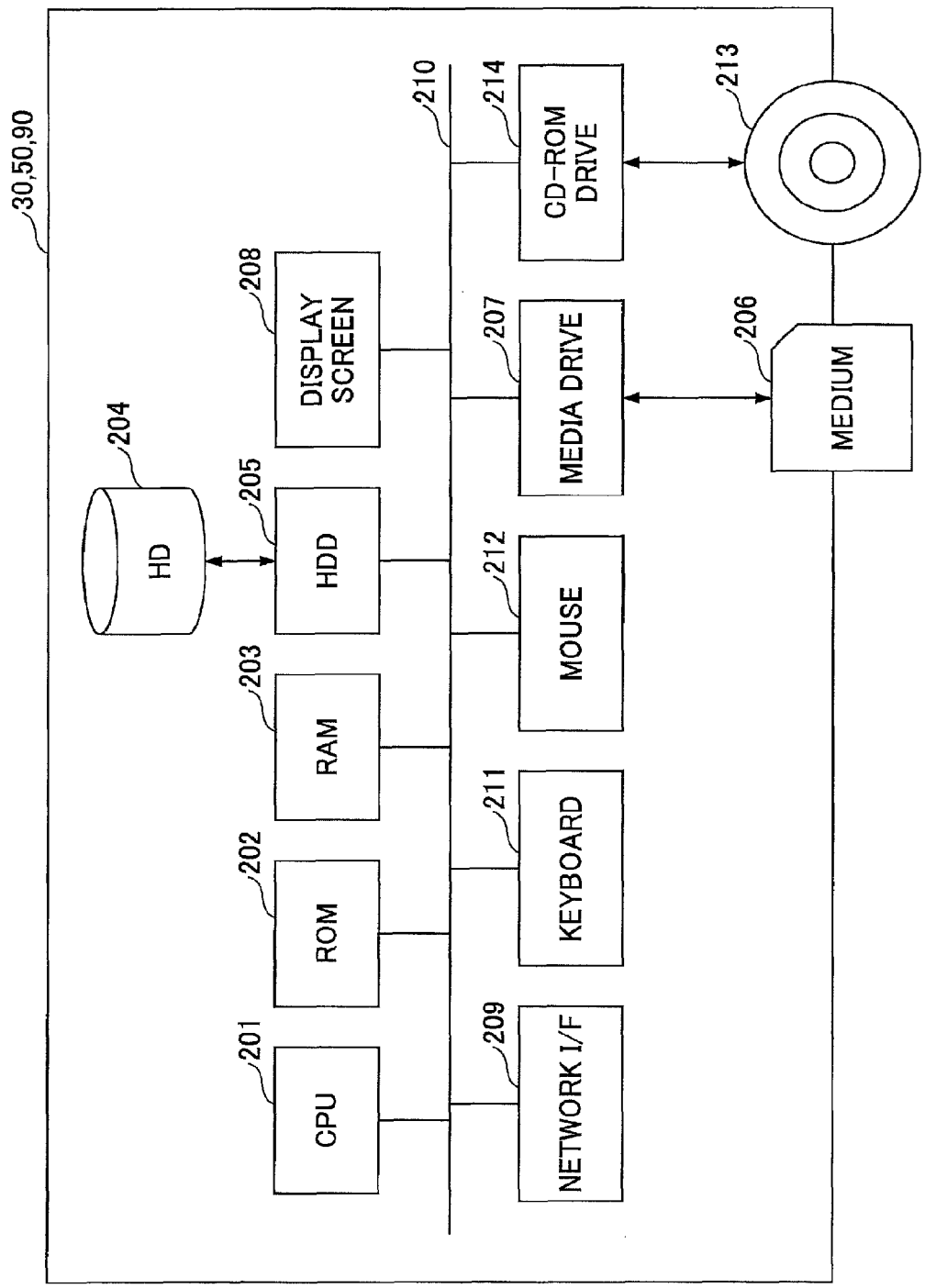
FIG. 12 is a diagram showing a hardware configuration of a management system of an embodiment.

FIG. 12 is a diagram showing a hardware configuration of the management system 50 of the embodiment. The management system 50 includes the CPU 201 that controls operations of the whole management system 50, a Read Only Memory (ROM) 202 that stores a transmission management program, a RAM 203 used as a work area for the CPU 201, a Hard Disk (HD) 204 that stores various types of data, a Hard Disk Drive (HDD) 205 that controls reading or writing of the various types of data from or in the HD 204 in accordance with control of the CPU 201, a media drive 207 that controls reading or writing (storing) of data from or in the recording medium 206 such as a flash memory, a display screen 208 that displays various types of information such as a cursor, menus, windows, characters, or images, a network I/F 209 that transmits data via the transmission network 2, a keyboard 211 having a plurality of keys for inputting characters, numerical values, and various types of instructions, a mouse 212 that selects various types of instructions to be executed, selects objects to be processed, and moves the cursor, a CD-ROM drive 214 that controls reading or writing of data from or in a Compact Disc Read Only Memory (CD-ROM) 213 as an example of a removable recording medium, and a bus line 210 such as an address bus or a data bus that electronically connects the above constituent elements as shown in FIG. 12.

In addition, the transmission management program may be recorded and distributed in a file in an installable or executable format within a computer-readable recording medium, such as the recording medium 206 or the CD-ROM 213.

Because the program providing system 90 has the same hardware configuration as in the management system 50, a description thereof is omitted. However, the ROM 202 stores a program providing program that controls the program providing system 90. In this case, the program providing program may also be recorded and distributed in a file in an installable or executable format within a computer-readable recording medium, such as the recording medium 206 or the CD-ROM 213.

In addition, other examples of the removable recording medium include computer-readable recording media, such as a Compact Disc Recordable (CD-R), a Digital Versatile Disk (DVD), and a Blu-ray disk.

Further, a program to be executed in each device in the embodiment is recorded and distributed in a file in an installable or executable format within a computer-readable recording medium, such as a CD-ROM, a flexible disk (FD), a CD-R, and a DVD.

The program to be executed in each device in the embodiment may be provided by storing it in a computer connected to a network, such as the Internet, and downloading it via the network. Further, the program to be executed in each device in the embodiment may be provided or distributed via a network, such as the Internet.

Further, the program to be executed in each device in the embodiment may be stored in a ROM or the like in advance and the ROM may be provided.

The program to be executed in each device in the embodiment has a module structure that includes the above units. In actual hardware, when the CPU reads and executes the program from the ROM or the HDD, one or a plurality of the above units are loaded on the RAM and the one or the plurality of units are generated on the RAM.

As shown in FIG. 9, the transmitting terminal 10 includes a power switch 10-1, an operation button 10-2, a display unit/operation unit 10-3, a microphone 10-4, a loudspeaker 10-5, a camera 10-6, and the like. The display unit/operation unit 10-3 configured with a touch panel that receives an input of an operation from the user and performs display for the user.

Figure 13:
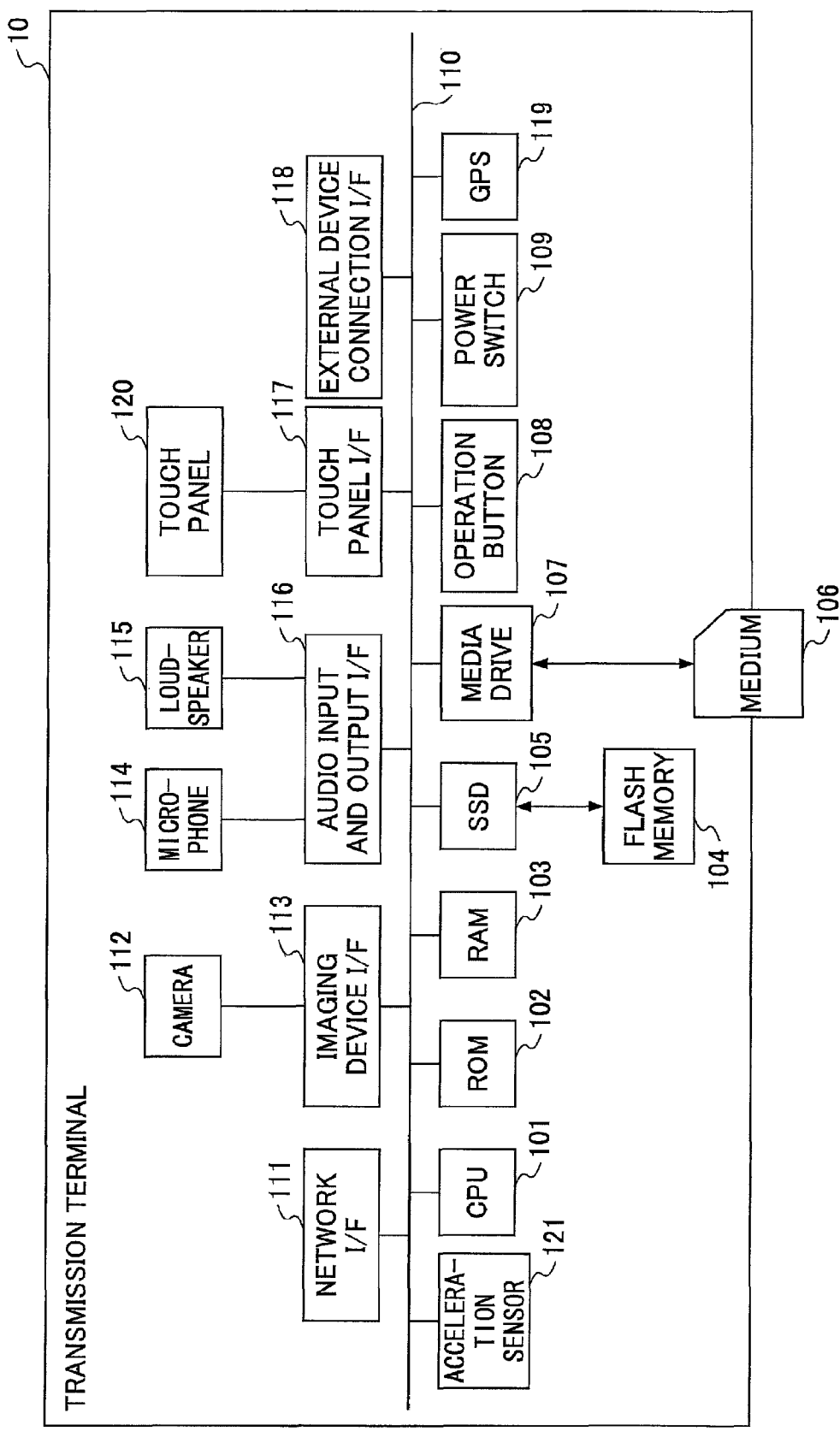
FIG. 13 is a diagram showing a hardware configuration of a terminal of an embodiment.

FIG. 13 is a diagram showing a hardware configuration of the terminal 10 in the embodiment. As shown in FIG. 13, the terminal 10 in the embodiment includes a Central Processing Unit (CPU) 101 that controls operations of the whole terminal 10, a Read Only Memory (ROM) 102 that stores a terminal program, a Random Access Memory (RAM) 103 used as a work area for the CPU 101, the flash memory 104 that stores various types of data such as image data and audio data, the Solid State Drive (SSD) 105 that controls reading or writing of the various types of data from or in the flash memory 104 in accordance with control of the CPU 101, a media drive 107 that controls reading or writing (storing) of data from or in a recording medium 106 such as flash memory, the operation button 108 that is operated to select the destination of the transmitting terminal 10, the power switch 109 to switch the terminal 10 ON/OFF, the network I/F (Interface) 111 that uses communication network 2, described below, to transmit data, the GPS 119 that obtains current location information based on information from a GPS satellite, and the acceleration sensor 121 that detects movement of the terminal 10. In addition, the SSD 105 may be a Hard Disk Drive (HDD).

The terminal 10 further includes the built-in camera 112 that obtains image data by imaging an object in accordance with control of the CPU 101, the imaging device I/F 113 that controls driving of the camera 112, the built-in microphone 114 that inputs audio, the built-in loudspeaker 115 that outputs audio, the audio input and output I/F 116 that processes input and output of audio signals between the microphone 114 and the loudspeaker 115 in accordance with control of the CPU 101, a touch panel I/F 117 that transfers image data to the touch panel 120 in accordance with control of the CPU 101, an external device connection I/F 118 that connects various types of external devices, and a bus line 110 such as an address bus or a data bus that electronically connects the above constituent elements as shown in FIG. 13.

The touch panel 120 is a display unit and an operation unit configured with a liquid crystal or organic EL panel that displays an image of an object, an icon for operation, or the like. The touch panel 120 is connected to the touch panel I/F 117.

The camera 112 includes a lens and a solid-state image sensing device that convers light into electric charge to turn an image (video) of an object into an electronic format. Examples of the solid-state image sensing device include a Complementary Metal Oxide Semiconductor (CMOS) and a Charge Coupled Device (CCD).

External devices such as an external camera, an external microphone, and an external loudspeaker can be electrically connected to the external device connection I/F 118.

If the external camera is connected, the external camera operates preferentially over the built-in camera 112 in accordance with control of the CPU 101. In the same manner, if the external microphone or the external loudspeaker is connected, the external microphone or the external loudspeaker operates preferentially over the built-in microphone 114 or the built-in loudspeaker 115, respectively, in accordance with control of the CPU 101.

The recording medium 106 is adapted to be removable for the terminal 10. Further, instead of the flash memory 104, an Electrically Erasable and Programmable ROM or the like may be used as long as a nonvolatile memory that reads or writes data in accordance with control of the CPU 101 is used.

Further, the terminal program may be recorded and distributed in a file in an installable or executable format within a computer-readable recording medium (such as the recording medium 106). Further, the terminal program may be stored in the ROM 102 instead of the flash memory 104.

If a computer to be used as the terminal 10 does not include a microphone or a camera, an external microphone or camera is assumed to be connected to the computer. In accordance with this, it is possible to use a general-purpose computer as the terminal 10 according to the embodiment.

In addition, the embodiment does not limit the scope of the present invention and each function unit included in the management system 50 may be disposed on the transmitting terminal 10. Further, the management system 50 may be configured with a plurality of servers and any of the servers may include any of the function units.

In the embodiment, a system configuration where the transmitting terminal 10 is connected to the management system 50 is exemplified. However, various alternative system configurations depending on purposes or objects are also possible.

According to the technique of the embodiment of the present invention, it is possible to provide a system that reduces information leakage risk.

Further, the present invention is not limited to the described embodiments, and various variations and modifications may be made without departing from the scope of the present invention.

The present application is based on and claims the benefit of priority of Japanese Priority Application No. 2015-029064 filed on Feb. 17, 2015, the entire contents of which are hereby incorporated by reference.

What is claimed is:

1. A transmission management system that controls data transmission between transmitting terminals, the data transmission being performed based on first identification information and second identification information, the transmission management system comprising:
    processing circuitry configured to
        receive location information about a first transmitting terminal which is a transmitting terminal at which the first identification information is currently associated and a second transmitting terminal which is a transmitting terminal at which the second identification information is currently associated, and receive first presence information indicating a first type of presence status of the first transmitting terminal from the first transmitting terminal; and
        transmit second presence information, indicating a second type of presence status of the first transmitting terminal, for reporting to the second transmitting terminal depending on (i) the first presence information and (ii) the location information about the first transmitting terminal and the location information about the second transmitting terminal,
    wherein in a case where the location information of the first transmitting terminal or the location information of the second transmitting terminal is a predetermined condition, and when the first presence information indicates an ability to respond, the processing circuitry transmits the second presence information indicating an inability to respond, differing from the first presence information, to the second transmitting terminal, and
    when the second presence information indicating the inability to respond is transmitted, the processing circuitry performs control to prevent transmission of data between the first transmitting terminal and the second transmitting terminal.

2. The transmission management system as claimed in claim 1, further comprising:
    a memory that stores the first presence information about the transmitting terminal with the first identification information in association with the location information about the transmitting terminal with the second identification information, and stores the second presence information about the transmitting terminal with the first identification information in association with the location information about the transmitting terminal with the second identification information; and
    the processing circuitry determines whether to transmit the first presence information or the second presence information about the transmitting terminal with the first identification information to the transmitting terminal with the second identification information based on the location information about the first transmission terminal or the location information about the second transmitting terminal received and the first presence information or the second presence information stored in the memory.

3. The transmission management system as claimed in claim 2, wherein
    the processing circuitry, in response to a request from first transmitting terminal with the first identification information, transmits location information about the transmitting terminal with the second identification information in a latest communication or a latest incoming communication to the transmitting terminal with the first identification information, and
    the memory, in response to a request from the transmitting terminal with the first identification information, stores presence information about the transmitting terminal with the first identification information to be transmitted to the transmitting terminal with the second identification information in association with the location information about the transmitting terminal with the second identification information.

4. The transmission management system as claimed in claim 1, wherein the processing circuitry transmits the first presence information or the second presence information about the transmitting terminal with the first identification information to the transmitting terminal with the second identification information depending on time information and the first location information or the second location information about the transmitting terminal with the second identification information received.

5. The transmission management system as claimed in claim 1, wherein while data is transmitted between the transmitting terminal with the first identification information and the transmitting terminal with the second identification information, if the processing circuitry receives the first location information or the second location information about the transmitting terminal with the second identification information, the processing circuitry transmits the first presence information or the second presence information about the transmitting terminal with the first identification information to the transmitting terminal with the second identification information depending on the first location information or the second location information about the transmitting terminal with the second identification information, and the processing circuitry stops data transmission between the transmitting terminal with the first identification information and the transmitting terminal with the second identification information depending on the first presence information or the second presence information about the transmitting terminal with the first identification information that is transmitted.

6. The transmission management system as claimed in claim 1, wherein when a communication start request to make a communication for the transmitting terminal with the first identification information from the transmitting terminal with the second identification information, to which presence information indicating unavailability is transmitted, is received, the processing circuitry transmits the communication start request, including information indicating that the communication start request is from the transmitting terminal with the second identification information to which the presence information indicating unavailability is transmitted, to the transmitting terminal with the first identification information.

7. A transmission management method performed by a transmission management system that controls data transmission between transmitting terminals, the data transmission being performed based on first identification information and second identification information, the transmission management method comprising:

receiving location information about a first transmitting terminal which is a transmitting terminal at which the first identification information is currently associated and a second transmitting terminal which is a transmitting terminal at which the second identification information is currently associated, and receive first presence information indicating a first type of presence status of the first transmitting terminal from the first transmitting terminal; and transmitting second presence information, indicating a second type of presence status of the first transmitting terminal, for reporting to the second transmitting terminal depending on (i) the first presence information and (ii) the location information about the first transmitting terminal and the location information about the second transmitting terminal, wherein in a case where the location information of the first transmitting terminal or the location information of the second transmitting terminal is a predetermined condition, and when the first presence information indicates an ability to respond, the method includes transmitting the second presence information indicating an inability to respond, differing from the first presence information, to the second transmitting terminal, and when the second presence information indicating the inability to respond is transmitted, the method includes performing control to prevent transmission of data between the first transmitting terminal and the second transmitting terminal.

8. A non-transitory computer-readable storage medium storing a computer-readable program that, when executed by a computer, causes the computer to perform the transmission management method as claimed in claim 7.

9. A transmission system comprising:

a transmission management system that controls data transmission between a first transmitting terminal and a second transmitting terminal, the data transmission being performed using first identification and second identification information; and the second transmitting terminal, wherein the transmission management system includes processing circuitry configured to receive location information about a first transmitting terminal which is a transmitting terminal at which the first identification information is currently associated and a second transmitting terminal which is a transmitting terminal at which the second identification information is currently associated, and receive first presence information indicating a first type of presence status of the first transmitting terminal from the first transmitting terminal; and transmit second presence information, indicating a second type of presence status of the first transmitting terminal, for reporting to the second transmitting terminal depending on (i) the first presence information and (ii) the location information about the first transmitting terminal and the location information about the second transmitting terminal, wherein in a case where the location information of the first transmitting terminal or the location information of the second transmitting terminal is a predetermined condition, and when the first presence information indicates an ability to respond, the processing circuitry transmits the second presence information indicating an inability to respond, differing from the first presence information, to the second transmitting terminal, and when the second presence information indicating the inability to respond is transmitted, the processing circuitry performs control to prevent transmission of data between the first transmitting terminal and the second transmitting terminal.

* * * * *